(12) United States Patent
Osawaru et al.

(10) Patent No.: US 10,370,597 B2
(45) Date of Patent: Aug. 6, 2019

(54) METHOD OF OBTAINING LIQUID BIOHYDROCARBONS FROM OILS OF NATURAL ORIGIN

(71) Applicant: INSTYTUT CHEMII PRZEMYSŁOWEJ IM. PROF. IGNACEGO MOŚCICKIEGO, Warsaw (PL)

(72) Inventors: Osazuwa Osawaru, Waszawa (PL); Jacek Kijenski, Warsaw (PL); Ewa Smigiera, Warsaw (PL); Anna Zgudka, Sulejówek (PL); Andrzej Kedziora, Żyrzy (PL); Krzysztof Tomon, Wrocław (PL)

(73) Assignee: Instyut Chemii Przemyslowej Im. Prof. Ignacego Moscickiego, Warsaw (PL)

( * ) Notice: Subject to any disclaimer, the term of this patent is extended or adjusted under 35 U.S.C. 154(b) by 0 days.

(21) Appl. No.: 15/754,201

(22) PCT Filed: Aug. 18, 2016

(86) PCT No.: PCT/PL2016/000089
§ 371 (c)(1),
(2) Date: Feb. 21, 2018

(87) PCT Pub. No.: WO2017/039471
PCT Pub. Date: Mar. 9, 2017

(65) Prior Publication Data
US 2018/0251684 A1 Sep. 6, 2018

(30) Foreign Application Priority Data
Aug. 28, 2015 (PL) .......................................... 413718

(51) Int. Cl.
*C10G 3/00* (2006.01)
*B01J 21/06* (2006.01)
*B01J 23/00* (2006.01)

(52) U.S. Cl.
CPC ................ *C10G 3/50* (2013.01); *B01J 21/06* (2013.01); *B01J 23/00* (2013.01); *C10G 3/45* (2013.01); *C10G 3/47* (2013.01); *C10G 3/48* (2013.01); *C10G 2300/1014* (2013.01); *C10G 2300/1018* (2013.01); *C10G 2400/04* (2013.01); *Y02P 30/20* (2015.11)

(58) Field of Classification Search
CPC ... C10G 3/00; C10G 3/42; C10G 3/44; C10G 3/45; C10G 3/47
See application file for complete search history.

(56) References Cited

U.S. PATENT DOCUMENTS

| 8,674,151 B2 * | 3/2014 | Debuisschert ........ C07C 1/2078 44/605 |
| 9,745,522 B2 | 8/2017 | Osawaru et al. |
| 2007/0135669 A1 | 6/2007 | Koivusalmi et al. |
| 2014/0243565 A1 | 8/2014 | Weck |

FOREIGN PATENT DOCUMENTS

| WO | 2008101948 A1 | 8/2008 |
| WO | 2009004180 A2 | 1/2009 |
| WO | WO2014081321 A1 * | 5/2014 ............... C11C 3/00 |

OTHER PUBLICATIONS

International Search Report for App. No. PCT/PL2016/000089 dated Dec. 13, 2016.
Xingmin Xu et al., "Two-step catalytic hydrodeoxygenation of fast pyrolysis oil to hydrocarbon liquid fuels", Chemosphere vol. 93, Issue 4, Oct. 2013, pp. 652-660, XP028723453.

* cited by examiner

*Primary Examiner* — Youngsul Jeong
(74) *Attorney, Agent, or Firm* — McBee Moore Woodward & Vanik IP, LLC

(57) ABSTRACT

In the method of obtaining liquid biohydrocarbons from oils of natural origin, in the first step, the oil and/or waste oil is/are heated in the presence of a mixture of hydrogen and carbon monoxide in the presence of a catalyst in the form of a metal oxide selected from a group comprising CoO, NiO, $MoO_3$, $ZrO_2$, or a mixture of such metal oxides, on an oxide support selected from a group comprising $SiO_2$, $Al_2O_3$, $TiO_2$, whereupon the product of the first step is contacted with hydrogen gas or with a mixture of hydrogen and carbon monoxide in the presence of a metallic catalyst selected from a group comprising Pd, Pt, Co/Mo, Ni/Mo, Zr on an oxide support selected from a group comprising $SiO_2$, $Al_2O_3$, $TiO_2$, $P_2O_5$, $ZrO_2$ or on a mixture of such oxides.

12 Claims, No Drawings

METHOD OF OBTAINING LIQUID BIOHYDROCARBONS FROM OILS OF NATURAL ORIGIN

This invention relates to a method of obtaining liquid biohydrocarbons from oils of natural origin, especially waste vegetable and animal oils, algal oils and lipid fractions of ligno-cellulose waste.

The high costs involved in the mining and processing of fossil fuels, their depleting resources, and limited global petroleum reserves have generated a greater interest in alternative fuels from renewable sources. In the area of diesel fuels obtained from renewable sources, there are two sub-areas: bio-diesel (fatty acid methyl esters), described for instance in: D. Srivivas, J. K. Satyarthi, Catal. Surv. Asia, 2011, 15, 145, E. F. Romalho et al., J. Therm. Anal. Calorim., 2011, 106, 825, C. L. Bianchi et al., Catal. Lett., 2010, 134, 179 and liquid biohydrocarbons—a mixture of saturated and unsaturated hydrocarbons, obtained by the hydrorefining of vegetable and animal oils; known, for instance, from the U.S. Pat. No. 8,119,847, they are also referred to as Renewable Diesel. In Europe, Neste introduced the name HVO (Hydrotreated Vegetable Oil) though it only relates to processed vegetable oils.

The use of fatty acid methyl esters as a diesel fuel requires costly modifications of diesel engines and injectors. The use of biodiesel generates higher operating costs because of its low lubricity, in addition, weather conditions in the winter significantly limit their applicability.

Given the above limitations on the use of the biodiesel, alternative fuels are being sought. There is a potential for making liquid biohydrocarbons from renewable sources (second and third-generation biofuels) by converting fatty acids from triglycerides and/or free fatty acids derived from fats of natural origin, especially waste vegetable oils, animal fats or algal oils as well as lipid fractions of ligno-cellulose waste to obtain saturated aliphatic hydrocarbons (n- and iso-paraffins). Liquid biohydrocarbons, whose properties are comparable to those of diesel fuel of petrochemical origin, can be used either as neat fuel or as a blend, at any concentration, with a petroleum-based oil. The fuel has the advantage of not requiring any engine modification and of being suitable for processing in refinery facilities which have currently been adapted for petroleum refining.

Two methods to obtain paraffins from fatty acids are described predominantly in the literature: hydrodeoxygenation, HDO ($R-COOH+3H_2 \rightarrow R-CH_3+2H_2O$), and decarboxylation ($R-COOH \rightarrow R-H+CO_2$), described for instance in J-G. Na et al., Catal. Today, 2012, 185, 313. In the HDO reaction, oxygen in the form of water is removed from fatty acids (hydrogenolysis). Typical hydrorefining catalysts, such as Ni/Mo or Co/Mo, are used in the HDO process. The HDO method ensures production of pure hydrocarbons which are fully compatible with conventional fuels, although it is energy-consuming because it requires the use of hydrogen at high pressures. The process of decarboxylation of fatty acids, removing $CO_2$ from the molecule, is an alternative to HDO. In contrast to HDO, water is not produced in the decarboxylation process; this has a favorable effect on the catalyst's activity, among other things. Both methods are conducted in periodic systems at elevated pressures.

A solution based on a single-stage processing of vegetable oils and animal fats to obtain paraffins by HDO in the presence of active metals and their mixtures (Ni, Co, Mo, W, Ni/Mo, Co/Mo), supported on graphite, aluminum and silicon oxides is disclosed in the U.S. Pat. No. 8,119,847. The process was conducted in an autoclave at a temperatures in the range 250-450° C. at hydrogen pressures in the range 3.4-17.2 MPa. Paraffins, in which the ratio of odd to even hydrocarbons is 2:1, were obtained with high selectivity.

Disclosed in Patent No. WO2009/004180A is a two-step process of hydrogenation of vegetable or animal fats or mixtures thereof where, in the first step, there occurs an initial hydrogenation of unsaturated bonds which are contained in the triglycerides, with the participation of hydrogen gas at temperatures in the range 50-300° C., at a hydrogen pressure in the range 0.1-10 MPa in the presence of a catalyst of which its active phase is a metal, preferably Ni, Co, Pd, Pt, Mo, W, deposited on an amorphous support. The process provides a partly saturated oil (mixture of triglycerides and free fatty acids, which contains a reduced number of unsaturated bonds). The essential process to obtain the mixture of liquid $C_{16}$-$C_{22}$ paraffin hydrocarbons by hydrorefining of the fats obtained in the first step takes place in the second step at temperatures in the range 200-450° C., at a hydrogen pressure in the range 1-10 MPa, in the presence of a sulfated catalyst having hydrodehydrogenating properties.

M. Snare et al., Fuel, 2008, 87, 933 reported a method to obtain biohydrocarbons from vegetable oils and animal fats in the presence of Pd/C at temperatures in the range 300-360° C. and hydrogen pressures in the range 1.5-2.7 MPa. In addition to hydrocarbons, a significant amount of unreacted carboxylic acids was found in the products obtained.

J-G. Na et al., Catal. Today, 2012, 185, 313 reported a method to obtain paraffins by decarboxylation of oil feedstock based on freshwater microalgae, after pretreating the algal oil, containing 36% triglycerides, by pyrolysis (600° C., 1 h) in order to obtain a feedstock for decarboxylation which contains $C_{16}$ and $C_{18}$ free fatty acids, hydrocarbons and compounds containing heteroatoms of nitrogen or sulfur. Volatile acids, aldehydes, ketones and furan compounds obtained in the pyrolysis process were separated from the feed to decarboxylation. The decarboxylation process was carried out in an autoclave at temperatures in the range 350-400° C. in the presence of hydrotalcites. The product obtained consisted mainly of $C_{15}$ and $C_{17}$ alkanes as well as partly unreacted carboxylic acids. The content of the fuel fraction for Diesel engines was 35% after the first step (pyrolysis) and 83.8% after decarboxylation.

In December 2012, Neste published the Neste Oil proprietary publication based on its studies in the area of the usability of hydrocarbons obtained from vegetable oil in diesel fuels (*HVO, Hydrotreated Vegetable Oil—a premium renewable biofuel for diesel engines*). The HVO process was carried out at pressures of approximately 30 MPa in the presence of Mo, Co, Pd as well as ZSM-5 and hydrogen gas as catalysts.

According to the Polish application P.401772, the process to obtain paraffin hydrocarbons from fats of natural origin, especially from waste vegetable oils, animal fats or algal oils, is carried out in two steps, in a coupled flow system, under atmospheric pressure, in the presence of heterophase catalysts. In the first step, the fat and/or waste fat are/is heated in the 100-500° C. temperature range, in the presence of an inert gas, in the presence of a catalyst in the form of a metal oxide (CoO, NiO, $Fe_2O_3$, $MoO_3$) on an oxide support ($SiO_2$, $Al_2O_3$, $TiO_2$, MgO), or a mixture of metal oxides on an oxide support, whereupon the product obtained in the first step is contacted in the 100-500° C. temperature range, in the presence of a metallic catalyst (Pd, Ru, Pt, Rh, Co/Mo, Ni/Mo, Mo, W, Fe, Zr), on the oxide support ($SiO_2$, $Al_2O_3$, $TiO_2$, MgO, $ZrO_2$) with hydrogen gas or a mixture of hydrogen and carbon monoxide. Decarboxylation and hydrodeoxygenation are the main reactions in the first step, whereas the olefins obtained after the first step are hydrogenated in the second step.

It was found that conducting the process described in P.401772 in the first step in the presence of a mixture of hydrogen and carbon monoxide results in the advantageous effect of the significant enrichment of the resulting product in n- and iso-paraffins, especially the $C_{12}$-$C_{17}$, fraction. This results from the formation, in the first step, of spatial isomers, mainly the unsaturated hexa- and heptadecene $C_{16}$ and $C_{17}$ hydrocarbons in the presence of the oxide catalyst. In particular, the effect is observed when a $ZrO_2$ catalyst is used. The effect was not observed at all in the case of conducting the first step in the presence of inert gas.

Moreover, it was found that the use of a mixture of hydrogen and carbon monoxide in the first step leads, unexpectedly, to higher selectivities of the $ZrO_2$ catalyst toward biohydrocarbons. When used in the presence of inert gas, the catalyst did not show such catalytic selectivity. It was observed that, when the first step of the process was conducted as described in P.401772, that is, in the presence of inert gas and the $ZrO_2/Al_2O_3$ catalyst, mainly ketones were obtained as product.

An additional unexpected advantageous result of the use of the mixture of CO and $H_2$ in the first step is the formation of hexamethylbenzene, which improves the resulting product in terms of stability and uniformity by dissolving any sediment that may be formed. The formation of hexamethylbenzene was not observed when inert gas was used.

In the method to obtain liquid biohydrocarbons from oils of natural origin, especially waste vegetable oils, animal fats, algal oils and lipid fractions of ligno-cellulose waste, carried out in two steps in a coupled flow system in the presence of heterophase catalysts according to the invention, in the first step, the oil or and/or waste oil is/are heated at temperatures in the range 100-500° C. at pressures in the range 0.1-5 MPa in the presence of a mixture of hydrogen and carbon monoxide in the presence of catalyst in the form of a metal oxide selected from a group comprising CoO, NiO, $MoO_3$, $ZrO_2$, or a mixture of such metal oxides, on an oxide support selected from a group comprising $SiO_2$, $Al_2O_3$, $TiO_2$, whereupon the product of the first step is contacted with hydrogen gas or with a mixture of hydrogen and carbon monoxide, at temperatures in the range 100-500° C., at pressures in the range 0.1-5 MPa, in the presence of a metallic catalyst selected from a group comprising Pd, Pt, Co/Mo, Ni/Mo, Zr on an oxide support selected from a group comprising $SiO_2$, $Al_2O_3$, $TiO_2$, $P_2O_5$, $ZrO_2$ or on a mixture of such oxides.

Preferably, in the first step of the process, the catalyst used is $ZrO_2$ or its mixture with a selected metal oxide or oxides.

Preferably, in both steps of the process, a mixture of hydrogen and carbon monoxide obtained by selective decomposition of methanol is used.

Preferably, in its first and/or second step, the process is carried out using atmospheric pressure.

The starting material in the process of the invention may be any natural oils, including waste vegetable oils and animal fats arising in food processing, algal oils, ligno-cellulose waste comprising triglycerides, as well as $C_6$-$C_{22}$ free fatty acids derived from sources such as, rapeseed, palm, coconut, sunflower, soy, linseed, maize, or peanut oils, animal, poultry, marine fats, prehydrolyzed fats, i.e., rendering fat, oils from various species of algae, ligno-cellulose or mixtures of fats and/or fatty acids.

Apart from methanol, the starting materials for obtaining the mixture of hydrogen and carbon monoxide include natural gas, waste polymers, biomass.

In the first step of the process of the invention, the products are formed mainly as the result of decarboxylation, hydrodeoxygenation (HDO), cracking and spatial isomerization. In the first step, a mixture of $C_6$-$C_{19}$ saturated and unsaturated hydrocarbons is obtained; in the second step, the hydrogenation of the olefins contained in the mixture resulting from step 1 and isomerization of the resulting n-paraffins take place, leading to the obtaining of a mixture of $C_6$-$C_{19}$ (mainly $C_2$-$C_{17}$) n- and iso-paraffins (liquid biohydrocarbons). The mixture of liquid biohydrocarbons resulting from the second step may be used as a fuel or component of liquid fuels, mainly diesel fuel.

The method of the invention is now illustrated by way of examples in which the following were used:

Feedstock I—rendering fat, acids C14:0 [1.7], C16:0 [21,8], C16:1 [5,5], C17:0 [1,1], C18:0 [13,9]. C18:1 [40,6], C18:2 [10,3]; other [5,1]. The first numerical value denotes the number of carbon atoms per molecule. The second numerical value denotes the number of double bonds [percentage by chromatography].

Feedstock II—rapeseed oil (UCO), acids C16:0 [10], C18:0 [1,1], C18:1 [46], C18:2 [13], C18:3 [4,5]; other [25,4]. The first numerical value denotes the number of carbon atoms per molecule. The second numerical value denotes the number of double bonds [percentage by chromatography].

Example 1

The process was carried out in a flow-type catalytic system. The process was carried out using the following catalysts: in step I—10% $ZrO_2/Al_2O_3$ in the amount of 0.5 kg, in step II—10% $Pd/(Al_2O_3)$ in the amount of 0.25 kg, after their activation at high temperatures. Temperature in the reactors in step I and step II was then lowered to 100° C. and the reactor in step I were fed with a mixture of hydrogen and carbon monoxide in a molar ratio of 1:2, respectively, at a rate of 4 dm3/h and with Feedstock I after heating it to a temperature of 60° C. at a rate of 0.2 dm$^3$/h. At the same time, the mixture of hydrogen and carbon monoxide was continued to be introduced at the same molar ratio in a continuous manner in Step II. Temperature was then increased successively to 420° C. (step I) and 300° C. (step II) and, as soon as the reaction conditions stabilized (approx. 1 h), the final product was collected. A pressure of 0.1 MPa was applied in the both steps.

At a 100% conversion of the acids, the content of saturated $C_6$-$C_{19}$ n- and iso-paraffins in the product was 87% by weight, of which $C_{12}$-$C_{17}$ constituted 82% by weight, and unsaturated $C_6$-$C_{19}$ in the amount of 8% by weight, of which $C_{12}$-$C_{17}$ constituted 2% by weight, and aromatics in the amount of 5% by weight, including 3% of hexamethylbenzene. The product after step I was found to have a content of 20% by weight of the spatial isomers of $C_{16}$-$C_{17}$.

Example 2

The process was carried out in a flow-type catalytic system. The process was carried out using the following catalysts: in step I—10% $NiO/Al_2O_3$ in the amount of 0.5 kg, in step II—10% $Pd/(Al_2O_3+SiO_2+P_2O_5)$ in the amount of 0.25 kg, after their activation at high temperatures. Temperature in the reactors in step I and step II was then lowered to 100° C. and the reactor in step I were fed with a mixture of hydrogen and carbon monoxide in a molar ratio of 1:2, respectively, at a rate of 4 dm³/h and with Feedstock I after heating it to a temperature of 60° C. at a rate of 0.2 dm³/h. At the same time, hydrogen gas was continued to be introduced in a continuous manner in Step II. Temperature was then increased successively to 420° C. (step I) and 300° C. (step II) and, as soon as the reaction conditions stabilized (approx. 1 h), the final product was collected. A pressure of 0.1 MPa was applied in the both steps.

At a 100% conversion of the acids, the content of saturated $C_6$-$C_{19}$ n- and iso-paraffins in the product was 88% by weight, of which $C_{12}$-$C_{17}$ constituted 80% by weight, and unsaturated $C_6$-$C_{19}$ in the amount of 6% by weight, of which $C_{12}$-$C_{17}$ constituted 2% by weight, and aromatics in the amount of 6% by weight, including 2% of hexamethylbenzene. The product after step I was found to have a content of 10% by weight of the spatial isomers of $C_{16}$-$C_{17}$.

Example 3

The process was carried out in a flow-type catalytic system. The process was carried out using the following catalysts: in step I—15% $ZrO_2/Al_2O_3$ in the amount of 0.5 kg, in step II—10% $Pd/(Al_2O_3+SiO2+P_2O_5)$ in the amount of 0.25 kg, after their activation at high temperatures. Temperature in the reactors in step I and step II was then lowered to 100° C. and the reactor in step I were fed with a mixture of hydrogen and carbon monoxide in a molar ratio of 1:2, respectively, at a rate of 4 dm³/h and with Feedstock II at a rate of 0.2 dm³/h. At the same time, the mixture of hydrogen and carbon monoxide was continued to be introduced at the same molar ratio in a continuous manner in Step II. Temperature was then increased successively to 420° C. (step I) and 300° C. (step II) and, as soon as the reaction conditions stabilized (approx. 1 h), the final product was collected. A pressure of 0.1 MPa was applied in the both steps.

At a 100% conversion of the acids, the content of saturated $C_6$-$C_{19}$ n- and iso-paraffins in the product was 87% by weight, of which $C_{12}$-$C_{17}$ constituted 80% by weight, and unsaturated $C_6$-$C_{19}$ in the amount of 5% by weight, of which $C_{12}$-$C_{17}$ constituted 2% by weight, and aromatics in the amount of 8% by weight, including 4% of hexamethylbenzene. The product after step I was found to have a content of 25% by weight of the spatial isomers of $C_{16}$-$C_{17}$.

Example 4

The process was carried out in a flow-type catalytic system. The process was carried out using the following catalysts: in step I—15% $ZrO_2/Al_2O_3$ in the amount of 0.5 kg, in step II—10% $Pd/(Al_2O_3+P_2O_5)$ in the amount of 0.25 kg, after their activation at high temperatures. Temperature in the reactors in step I and step II was then lowered to 100° C. and the reactor in step I were fed with a mixture of hydrogen and carbon monoxide in a molar ratio of 1:2, respectively, at a rate of 4 dm³/h and with Feedstock II at a rate of 0.2 dm³/h. At the same time, the mixture of hydrogen and carbon monoxide was continued to be introduced at the same molar ratio in a continuous manner in Step II. Temperature was then increased successively to 420° C. (step I) and 300° C. (step II) and, as soon as the reaction conditions stabilized (approx. 1 h), the final product was collected. A pressure of 0.1 MPa was applied in the both steps.

At a 100% conversion of the acids, the content of saturated $C_6$-$C_{19}$ n- and iso-paraffins in the product was 87% by weight, of which $C_{12}$-$C_{17}$ constituted 82% by weight, and unsaturated $C_6$-$C_{19}$ in the amount of 5% by weight, of which $C_{12}$-$C_{17}$ constituted 2% by weight, and aromatics in the amount of 8% by weight, including 5% of hexamethylbenzene. The product after step I was found to have a content of 30% by weight of the spatial isomers of $C_{16}$-$C_{17}$.

Example 5

The process was carried out in a flow-type catalytic system. The process was carried out using the following catalysts: in step I—10% $ZrO_2/Al_2O_3$ in the amount of 0.5 kg g, in step II—10% $Pd/ZrO_2$ in the amount of 0.3 kg, after their activation at high temperatures. Temperature in the reactors in step I and step II was then lowered to 100° C. and the reactor in step I were fed with a mixture of hydrogen and carbon monoxide in a molar ratio of 1 and 2, respectively, at a rate of 4 dm³/h and with Feedstock II at a rate of 0.2 dm³/h. At the same time, the mixture of hydrogen and carbon monoxide was continued to be introduced at the same molar ratio in a continuous manner in Step II. Temperature was then increased successively to 420° C. (step I) and 300° C. (step II) and, as soon as the reaction conditions stabilized (approx. 1 h), the final product was collected. A pressure of 0.1 MPa was applied in the both steps.

At a 100% conversion of the acids, the content of saturated $C_6$-$C_{19}$ n- and iso-paraffins in the product was 86% by weight, of which $C_{12}$-$C_{17}$ constituted 81% by weight, and unsaturated $C_6$-$C_{19}$ in the amount of 8% by weight, of which $C_{12}$-$C_{17}$ constituted 3% by weight, and aromatics in the amount of 6% by weight, including 3% of hexamethylbenzene. The product after step I was found to have a content of 20% by weight of the spatial isomers of $C_{16}$-$C_{17}$.

Example 6

The process was carried out in a flow-type catalytic system. The process was carried out using the following catalysts: in step I—15% $ZrO_2/SiO_2$ in the amount of 0.5 kg, in step II—5% $Pt/(Al_2O_3+SiO_2+P_2O_5)$ in the amount of 0.25 kg, after their activation at high temperatures. Temperature in the reactors in step I and step II was then lowered to 100° C. and the reactor in step I were fed with a mixture of hydrogen and carbon monoxide in a molar ratio of 1:2, respectively, at a rate of 4 dm³/h and with Feedstock II at a rate of 0.2 dm³/h. At the same time, the mixture of hydrogen and carbon monoxide was continued to be introduced at the same molar ratio of 1 and 2 in a continuous manner in Step II. Temperature was then increased successively to 420° C. (step I) and 300° C. (step II) and, as soon as the reaction conditions stabilized (approx. 1 h), the final product was collected. A pressure of 2 MPa was applied in the both steps.

At a 100% conversion of the acids, the content of saturated $C_6$-$C_{19}$ n- and iso-paraffins in the product was 88% by weight, of which $C_{12}$-$C_{17}$ constituted 83% by weight, and unsaturated $C_6$-$C_{19}$ in the amount of 7% by weight, of which $C_{12}$-$C_{17}$ constituted 5% by weight, and aromatics in the amount of 5% by weight, including 3% of hexamethylbenzene. The product after step I was found to have a content of 25% by weight of the spatial isomers of $C_{16}$-$C_{17}$.

Example 7

The process was carried out in a flow-type catalytic system. The process was carried out using the following catalysts: in step I—5% $MoO/10\% CoO/SiO_2$ in the amount of 0.5 kg, in step II—10% $Pd/Al_2O_3$ in the amount of 0.25 kg after their activation at high temperatures. Temperature in the reactors in step I and step II was then lowered to 100° C.

and the reactor in step I were fed with a mixture of hydrogen and carbon monoxide in a molar ratio of 1:2, respectively, at a rate of 4 dm$^3$/h and with Feedstock I after heating it to a temperature of 60° C. at a rate of 0.2 dm$^3$/h. At the same time, hydrogen gas was continued to be introduced in a continuous manner in Step II. Temperature was then increased successively to 420° C. (step I) and 300° C. (step II) and, as soon as the reaction conditions stabilized (approx. 1 h), the final product was collected. A pressure of 0.1 MPa was applied in the both steps.

At a 100% conversion of the acids, the content of saturated $C_6$-$C_{19}$ n- and iso-paraffins in the product was 86% by weight, of which $C_{12}$-$C_{17}$ constituted 82% by weight, and unsaturated $C_6$-$C_{19}$ in the amount of 9% by weight, of which $C_{12}$-$C_{17}$ constituted 6% by weight, and aromatics in the amount of 5% by weight, including 2% of hexamethylbenzene. The product after step I was found to have a content of 20% by weight of the spatial isomers of $C_{16}$-$C_{17}$.

For comparison:

The product obtained according to the method described in the Polish patent application P.401772 (Example XII) has a content of saturated $C_6$-$C_{18}$ hydrocarbons in the amount of 85% by weight, of which $C_{12}$-$C_{17}$ constitutes 66% by weight, unsaturated [hydrocarbons] $C_6$-$C_{18}$ in the amount of 7.2% by weight, of which $C_{12}$-$C_{17}$ constitutes 6% by weight, and 7.8% by weight of other products, mainly esters and alcohols. No spatial isomers were found after step I. Moreover, the formation of hexamethylbenzene was not observed.

The invention claimed is:

1. A method of obtaining liquid biohydrocarbons from oils of natural origin, carried out in two steps in a coupled flow system in the presence of heterophase catalysts,
    wherein in the first step,
        the oils of natural origin are heated at a temperature in a range of 100-500° C.,
        at a pressure in a range of 0.1-5 MPa in the presence of a mixture of hydrogen and carbon monoxide, and
        in the presence of a catalyst in the form of a metal oxide selected from a group comprising CoO, NiO, MoO$_3$, ZrO$_2$, or a mixture of such metal oxides, on an oxide support selected from a group comprising SiO$_2$, Al$_2$O$_3$, TiO$_2$, thereby producing a product of the first step,
    and wherein in the second step, the product of the first step is contacted with hydrogen gas or with a mixture of hydrogen and carbon monoxide
        at a temperature in a range of 100-500° C.,
        at a pressure in a range of 0.1-5 MPa, and
        in the presence of a metallic catalyst selected from a group comprising Pd, Pt, Co/Mo, Ni/Mo, Zr on an oxide support selected from a group comprising SiO$_2$, Al$_2$O$_3$, TiO$_2$, P$_2$O$_5$, ZrO$_2$ or on a mixture of such oxides.

2. The method as claimed in claim 1, wherein the catalyst used in the first step of the process is ZrO$_2$ or a mixture of ZrO$_2$ and one or more metal oxides selected from the group consisting of CoO, NiO, and MoO$_3$.

3. The method as claimed in claim 1, wherein the mixture of hydrogen and carbon monoxide used in the first and second steps of the process is a mixture obtained by a selective decomposition of methanol.

4. The method as claimed in claim 1, wherein the first and/or second step of the process is/are carried out under atmospheric pressure.

5. The method of claim 1, wherein the oils of natural origin are selected from the group consisting of vegetable oils, animal fats, algal oils and lipid fractions of lignocellulose waste.

6. The method of claim 1, wherein the mixture of hydrogen and carbon monoxide is in a hydrogen to carbon monoxide molar ratio of 1 to 2.

7. The method of claim 1, wherein the first step produces spatial isomers and/or hexamethylbenzene.

8. The method of claim 1, wherein the first step produces 10-30% by weight of spatial isomers and/or 2-5% by weight of hexamethylbenzene in the product of the first step.

9. The method of claim 5,
    wherein the mixture of hydrogen and carbon monoxide is in a hydrogen to carbon monoxide molar ratio of 1 to 2; and
    wherein the first step produces 10-30% by weight of spatial isomers and/or 2-5% by weight of hexamethylbenzene in the product of the first step.

10. The method of claim 1,
    wherein the first step consists essentially of:
        heating oils of natural origin at a temperature in a range 100-500° C.,
        at a pressure in a range 0.1-5 MPa in the presence of a mixture of hydrogen and carbon monoxide, and
        in the presence of a catalyst in the form of a metal oxide selected from a group comprising CoO, NiO, MoO3, ZrO$_2$, or a mixture of such metal oxides, on an oxide support selected from a group comprising SiO$_2$, Al$_2$O$_3$, TiO$_2$, thereby producing a product of the first step, and
    wherein the second step consists essentially of:
        the product of the first step is contacted with hydrogen gas or with a mixture of hydrogen and carbon monoxide,
        at a temperature in a range of 100-500° C.,
        at a pressure in a range of 0.1-5 MPa, and
        in the presence of a metallic catalyst selected from a group comprising Pd, Pt, Co/Mo, Ni/Mo, Zr on an oxide support selected from a group comprising SiO$_2$, Al$_2$O$_3$, TiO$_2$, P$_2$O$_5$, ZrO$_2$ or on a mixture of such oxides.

11. The method of claim 10, wherein the oils of natural origin are selected from the group consisting of vegetable oils, animal fats, algal oils and lipid fractions of lignocellulose waste.

12. The method of claim 10,
    wherein the mixture of hydrogen and carbon monoxide is in a hydrogen to carbon monoxide molar ratio of 1 to 2; and
    wherein the first step produces 10-30% by weight of spatial isomers and/or 2-5% by weight of hexamethylbenzene in the product of the first step.

* * * * *